United States Patent [19]

Frey et al.

[11] Patent Number: 5,030,602

[45] Date of Patent: Jul. 9, 1991

[54] STABLE CERAMIC CONSISTING OF ALUMINUM OXIDE

[75] Inventors: Thomas Frey, Lauf; Karl-Hermann Friese, Leonberg; Heinz Geier, Gerlingen, all of Fed. Rep. of Germany

[73] Assignee: Robert Bosch GmbH, Stuttgart, Fed. Rep. of Germany

[21] Appl. No.: 381,716

[22] PCT Filed: Jun. 24, 1987

[86] PCT No.: PCT/DE87/00285

§ 371 Date: Feb. 27, 1989

§ 102(e) Date: Feb. 27, 1989

[87] PCT Pub. No.: WO88/01610

PCT Pub. Date: Mar. 10, 1988

[30] Foreign Application Priority Data

Aug. 27, 1986 [DE] Fed. Rep. of Germany ....... 3629100

[51] Int. Cl.$^5$ ............................................. C04B 35/10
[52] U.S. Cl. ..................................... 501/127; 501/153
[58] Field of Search ................................ 501/127, 153

[56] References Cited

U.S. PATENT DOCUMENTS 2,760,875  9/1956  Schwartzwalder et al. ....... 501/144
2,887,394  5/1959  Bickford et al. ..................... 501/153
3,935,017  1/1976  Gardner ............................... 501/153

FOREIGN PATENT DOCUMENTS 1059956  2/1967  United Kingdom ................ 501/153

Primary Examiner—William R. Dixon, Jr.
Assistant Examiner—Melissa Bonner
Attorney, Agent, or Firm—Michael J. Striker

[57] ABSTRACT

A ceramic consisting substantially of $Al_2O_3$ as ceramic support, ceramic cover layer and/or ceramic supporting structure for heating conductors is described, which is electrochemically stable, which, in other words, does not decompose on application of a heating voltage, even in long-term operation at temperatures above 600°. Such a ceramic exhibits a very small alkali metal content, of less than 0.2% by weight $Na_2O$ and $K_2O$ respectively. Particularly favorable processing, in particular pressing properties are exhibited by such a ceramic if it has 2.5 to 10% by weight of barium silicate or strontium silicate fluxes, the proportions of $Na_2O$, $K_2O$, CaO and MgO together make up less than 1% by weight, and the BaO or $SrO:SiO_2$ molar ratio is between 2:1 and 1:12.5. Such a ceramic with a $BaO:SiO_2$ ratio of 2.6:1 parts by weight is electrochemically stable up to approximately 1400° C., and at 1300° C. still exhibits a bending strength of approximately 300 N/mm$^2$.

4 Claims, No Drawings ions which have a medium mobility, i.e. Na, K, Ca and Mg, only being present in small concentrations. For this purpose, appropriately pure aluminium oxide and an Al-silicate which, as flux, has a softening point above the intended service temperature are used. The content of Na, K, Ca and Mg ions comes to below 1% by weight. Ions which move only with difficulty, because they are large, e.g. Ba and Sr ions, are permitted in the flux. The flux in this case consists of a barium silicate or of a strontium silicate. The BaO or SrO/SiO$_2$ molar ratio lies between 2:1 and 1:12.5. The amount of flux lies between 2.5 and 10% by weight. The electrochemical stability gave a limiting temperature of 1350° C.

3RD EXAMPLE

Al$_2$O$_3$ ceramic with barium-silicate flux

In this example an Al$_2$O$_3$ ceramic was produced, the flux consisting of a barium silicate with BaO:SiO$_2$ molar ratios between 2:1 and 1:12.5, and the proportion of flux varied between 2.5 and 10% by weight. Here too it applied that foreign ions of average mobility (Na, K, Ca, Mg) should be present only in very small concentrations, namely less than 1% by weight. The electrochemical stability gave a limiting temperature of 1400° C. The bending strength at 1200° C. was 300 N/mm$^2$, thus precisely the same high value as with flux-free material. This ceramic is therefore outstandingly suitable for use in high-temperature heating conductors, and the mass has good processing properties.

We claim:

1. An electrochemically stable ceramic used for making a ceramic support, a ceramic coating layer and a ceramic support skeleton for a heating conductor, which comprises alumina with alkali metal oxides and from 2.5 to 10 percent by weight of a flux consisting essentially of a barium silicate with a BaO:SiO$_2$ molar ratio of from 2:1 and 1:12.5, the sum of the Na$_2$O, K$_2$O, CaO and MgO content being less than 1 percent by weight, while the sum of the Na$_2$O and K$_2$O, CaO and MgO are initially present as impurities in the barium silicate and the alumina.

2. The ceramic defined in claim 1 wherein said ceramic contains less than 0.1% by weight of Na$_2$O and K$_2$O respectively.

3. The ceramic defined in claim 1 wherein said Na$_2$O, K$_2$O, CaO and MgO are present in a total quantity of less than 1% by weight.

4. The ceramic defined in claim 1 wherein said ceramic is annealed after sintering at 1250° C. for one to three hours.

This example represent a particularly preferred variant of the ceramic according to the invention, because, besides the electrochemical stability, it exhibits as compared with the previously mentioned examples, improved processing properties, in particular a more favourable pressing behaviour. The ceramic indicated by way of example has the following composition: 91.0% by weight $Al_2O_3$; 6.48% by weight BaO and 2.52% by weight $SiO_2$; this corresponds to a $BaO:SiO_2$ ratio of 2.6:1 parts by weight or of 1:1 moles. Since alkali metal and CaO or MgO proportions are to remain below one per cent by weight and alkali metal proportions themselves below 0.2% weight, an aluminium oxide having 99.5% $Al_2O_3$ is used. The barium oxide is introduced in the form of barium carbonate, and the $SiO_2$ component at least predominantly as kaolinite or halloysite; this leads to favourable production and pressing properties. The components mentioned are treated and tested as described above. When a direct-current voltage of 12.5 V was applied, this ceramic showed itself to be electrochemically stable up to 1400° C., in a long-term test, when used both as supporting structure for heating conductors and also for covering the semiconductor. Moreover, an increased strength is surprisingly to be found at temperatures above 1000° C.; indeed, in this case a bending strength of $300N/mm^2$ is achieved at 1300° C. The slight decrease of the strength at these high temperatures is attributable to an extensive crystallizing-out of the glass phase. This ceramic already sinters at 1525° C. to 96% of the theoretical density (estimated from the phase analysis).

While our invention has been illustrated and described as embodied in a ceramic, it is not intended to be limited to the details of the examples described above, since various modifications and changes may be made without departing in any way from the spirit of our present invention.

Without further analysis, the foregoing will so fully reveal the gist of our present invention that others can, by applying current knowledge, readily adapt it for various applications without omitting features that, from the standpoint of the prior art, farily constitute essential characteristics of the generic or specific aspects of this invention.

What is claimed as new and desired to be protected by Letters Patent is set forth the appended claims:

1. In an electrochemically stable ceramic comprising alumina with alkali metal and alkaline earth metal oxides used for making a ceramic support, ceramic coating layer and a ceramic support skeleton for a heating conductor, the improvement consisting of adding from 2.5 to 10 percent by weight of a flux consisting essentially of a barium silicate with a $BaO:SiO_2$ molar ratio of from 2:1 and 1:12.5, the sum of $Na_2O$, $K_2O$, CaO and MgO content being less than 1 percent by weight while the sum of said $Na_2O$ and $K_2O$ content is less than 0.2 percent by weight, said $Na_2O$, $K_2O$, CaO and MgO being initially present as impurities in said barium silicate and said alumina.

2. The improvement defined in claim 1 wherein said sum of said $Na_2O$ and $K_2O$ contents is less than 0.1% by weight.

3. The improvement defined in claim 1 wherein said $SiO_2$ has been introduced as kaolinite and BaO as carbonates.

4. The improvement defined in claim 1 wherein said $SiO_2$ has been introduced as halloysite and BaO as carbonates.

* * * * *